United States Patent
Kreitzer et al.

(10) Patent No.: US 7,139,586 B2
(45) Date of Patent: Nov. 21, 2006

(54) METHOD AND SYSTEM FOR TARGETED BROADCASTING

(75) Inventors: Stuart S. Kreitzer, Coral Springs, FL (US); David R. Heeschen, Coral Springs, FL (US); John N. Shemelynce, Fort Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 149 days.

(21) Appl. No.: 11/026,727

(22) Filed: Dec. 30, 2004

(65) Prior Publication Data
US 2006/0148467 A1    Jul. 6, 2006

(51) Int. Cl.
*H04B 7/00* (2006.01)

(52) U.S. Cl. .................. 455/518; 455/519; 455/520; 455/526; 455/414.1; 709/219

(58) Field of Classification Search ............. 455/414.1, 455/414.2, 458, 426.1, 456.1, 456.2, 456.3, 455/456.4, 456.5, 456.6, 518, 519, 520, 186.1, 455/526, 416; 379/114
See application file for complete search history.

(56) References Cited

U.S. PATENT DOCUMENTS

| | | | | |
|---|---|---|---|---|
| 6,434,398 B1 * | 8/2002 | Inselberg | ............... | 455/517 |
| 6,803,862 B1 * | 10/2004 | O'Connor et al. | .......... | 340/994 |
| 6,952,558 B1 * | 10/2005 | Hardacker | ............. | 455/3.06 |
| 7,035,657 B1 * | 4/2006 | Chen et al. | ............... | 455/518 |
| 7,058,395 B1 * | 6/2006 | Dowling et al. | ......... | 455/414.2 |
| 2002/0031097 A1 * | 3/2002 | Jung | ............... | 370/270 |
| 2002/0063799 A1 * | 5/2002 | Ortiz et al. | ............. | 348/559 |
| 2003/0045301 A1 * | 3/2003 | Wollrab | ............ | 455/456 |
| 2004/0008657 A1 * | 1/2004 | Lee et al. | ............. | 370/342 |
| 2004/0140989 A1 | 7/2004 | Papageorge | | |
| 2004/0203644 A1 | 10/2004 | Anders et al. | | |
| 2004/0204063 A1 | 10/2004 | Van Erlach | | |
| 2005/0113123 A1 * | 5/2005 | Torvinen | ............. | 455/519 |
| 2006/0126556 A1 * | 6/2006 | Jiang et al. | ............. | 370/328 |

OTHER PUBLICATIONS

Nascar.com, "Trackpass," http://products.digitalorchid.com/nascartogo/features.asp?nav=Y&featureid=demo.html#trackpass, site last visited Dec. 30, 2004.

* cited by examiner

*Primary Examiner*—Joseph Feild
*Assistant Examiner*—Olumide Ajibade-Akonai

(57) ABSTRACT

A system (20) of targeted broadcasting in a cellular communication system during an event can include at least one mobile unit (25) having stored therein scheduling information relating to an event, a designated location for the event, and a designated group channel for monitoring such event. The mobile unit can further be programmed to monitor (67) for the event in a designated location and on a designated group channel during a predetermined time window and receive (71) a targeted message during the event on the designated group channel if a current location of the mobile unit matches the designated location stored. The mobile unit can be programmed to transmit at least one group call message response in response to receiving the group call message only when the mobile unit is in the designated location. The system can further include fixed network equipment (26) that transmits data related to the event.

20 Claims, 5 Drawing Sheets

METHOD AND SYSTEM FOR TARGETED BROADCASTING

FIELD OF THE INVENTION

This invention relates generally to broadcast systems, and more particularly to a method and system for broadcasting in a targeted fashion.

BACKGROUND OF THE INVENTION

Existing communication systems such as point-to-point and multicast systems that send data over the air to a large group of subscribers at an event generally perform poorly because packet data channels cannot support many closely clustered phones in use simultaneously. In this regard, existing wireless applications that provide content directly to a mobile phone enabling fans to receive live data such as leader board updates for race or competition results, breaking news throughout the day, competitor or team information, scheduling and venue information, weekly updated photos. Note, though, that some of these systems are designed to provide event data anytime, anywhere instead of a system optimized for a targeted audience having a large number of subscribers attending an event.

Some existing wireless applications deliver real-time race information to subscribers on existing wireless networks, but fail to deliver a broadcast that is delivered locally to just the immediate vicinity of an event using group call. Instead, existing wireless applications use a packet data application that is delivered to a wide area including to wherever a user roams. Thus, the performance at the site of an event is hampered in such a system because of the overload in traffic in a particular location. A system in this regard using packet data requires incremental network resources for each user. In practice, at events where many users try to use packet data simultaneously, the packet data channels are so overloaded that the existing wireless application slows to a crawl or stops working all together.

SUMMARY OF THE INVENTION

Embodiments in accordance with the present invention can provide a targeted or event broadcast using group data to accommodate an almost limitless number of phones in a single cell. Although group calls typically cover a wide geography, the group calls herein can be customized and targeted for a small coverage area. Embodiments in accordance with the present invention can utilize techniques for limiting the coverage of a group data call.

In a first embodiment of the present invention, a system of targeted broadcasting in a cellular communication system during an event can include at least one mobile unit having stored therein scheduling information relating to an event, a designated location for the event, and a designated group channel for monitoring such event. The system can include at least one mobile unit programmed to receive and store the scheduling information relating to the event, the designated location information, and the designated group channel to monitor for receipt of a targeted broadcast. The mobile unit can further be programmed to monitor at least one among the event, the designated location information, and the designated group channel during a predetermined time window and receive a targeted message during the event on the designated group channel if a current location of the at least one mobile unit matches the designated location information stored. The mobile unit can be programmed to transmit at least one group call message response in response to receiving the group call message only when the mobile unit is in the designated location. The system can further include fixed network equipment that transmits data related to the event. The fixed network equipment can be coupled to a server providing data related to the event and the fixed network equipment can further include a processor programmed to broadcast a group call message to the plurality of mobile units and a plurality of other mobile units, receive at least one group call message response from one among the plurality of mobile units, and broadcast group call data related to the event to designated locations among locations where the group call message response was transmitted from among the plurality of mobile units. The system can further include an application services gateway that provides a data overlay for a group call enabling a voice channel to be used as a data channel. The fixed network equipment, in addition to the group call message, can transmit at least one among voice call, packet data, and push-to-talk over cellular communication type calls.

In a second embodiment of the present invention, a system for sending targeted broadcasts on a cellular communication system having a plurality of mobile units having stored therein scheduling information relating to an event, a designated location for the event, and a group channel for monitoring such event can include fixed network equipment that can transmit data related to the event. The designated location for the event can correspond to at least one predetermined cell designated to cover the event and such predetermined cell can transmit a cell identifier. The fixed network equipment can be coupled to a server providing data related to the event. The fixed network equipment can further include a processor programmed to broadcast a group call message to the plurality of mobile units and a plurality of other mobile units, receive at least one group call message response from one among the plurality of mobile units, and broadcast group call data related to the event to designated locations among locations where the group call message response was transmitted from among the plurality of mobile units. The fixed network equipment, in addition to the group call message, can transmit at least one among voice call, packet data, and push-to-talk over cellular communication type calls. The system can further include a application services gateway that provides a data overlay for a group call enabling a voice channel to be used as a data channel. Of course, the system in accordance with embodiments herein can also optionally or alternatively use dedicated broadcast channels to send the group call data. Note, the fixed network equipment can be programmed to transmit duplicate packets of the group call data related to the event. Also note that at least one among the plurality of mobile units are programmed to transmit at least one group call message response in response to receiving the group call message only when the at least one mobile unit is in the designated location.

In a third embodiment of the present invention, a method of targeted broadcasting in a cellular communication system during an event can include the steps at a mobile cellular unit of receiving and storing scheduling information relating to the event, designated location information, and a designated group channel to monitor for receipt of such targeted broadcast. The method can further include the steps of monitoring for at least one among the event, the designated location information, and the designated group channel during a predetermined time window and the step of receiving a targeted message during the event on the designated group channel if a current location matches the designated location information stored. The step of receiving the targeted message on the designated group channel can include receiving the targeted message only in a set of designated cell locations after at least one among a group of mobile cellular units provides a group call response in a cell among the set of designated cell locations. The targeted message can be a half-duplex group call. The targeted message can also be received in segmented portions over a period of time. The method can further include the step of transmitting a group call response in response to receiving a group call page request only when the mobile cellular unit is a location matching the designated location information. The method can further include the step of determining the current location by performing one among the steps of monitoring a control channel for a location identifier and monitoring a GPS receiver for GPS information. The method can also ignore the targeted message if the mobile cellular unit's current location fails to match the designated location information. Optionally, a user can opt-out of receiving the targeted message by de-affiliating from the designated group channel.

Other embodiments, when configured in accordance with the inventive arrangements disclosed herein, can include a system for performing and a machine readable storage for causing a machine to perform the various processes and methods disclosed herein.

DETAILED DESCRIPTION OF THE DRAWINGS

Figure 1:
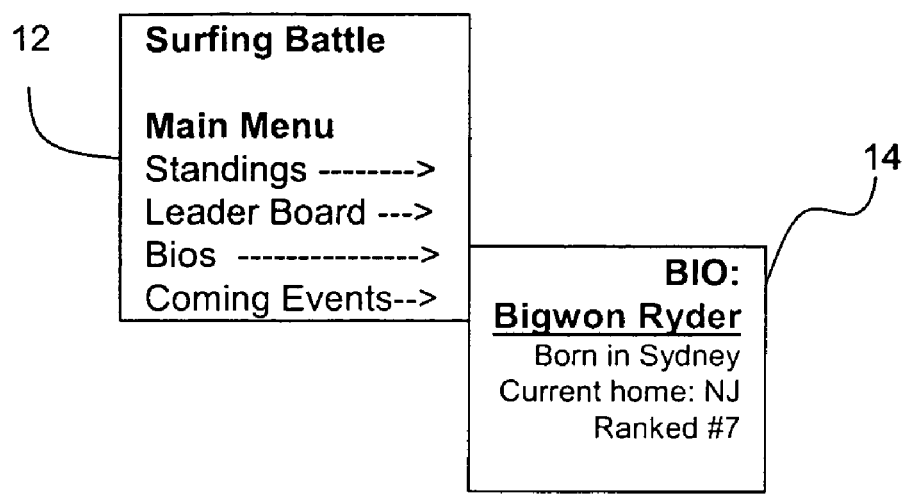
FIG. 1 is an illustration of an application such as a Java Applet screen used on a mobile unit in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Targeted broadcasts or event broadcasts can allow users attending an event such as an automobile race, a surfing, skiing or snowboarding competition or practically any other event to receive event related information such as scores, standings, schedules, and athlete bios delivered directly to their phones. A Java applet made available on phones can allow users to receive and view the event information while they are enjoying the event in person. The information and application can be done in real time during the event and in the immediate vicinity of the event. Also, targeted or event broadcasts can send the event information over a Talk Group channel rather than using packet data which results in substantially more efficient network usage. Although GPS can be used to determine a mobile phone's proximity to the event, other techniques using a combination of a cell broadcast ID and logic in a Java applet can limit delivery of event information to users attending the event or close to the event. In this regard, a targeted or event broadcast (EB) in accordance with an embodiment of the invention can target just the cell site or sites that are covering the event. By targeting messages in this manner, network resources are used efficiently and users who aren't at the event are not bothered with event details that may be superfluous to them. For example, if you're miles away from the event, you are unlikely to care about who's on stage next.

Referring to FIG. 1, an example of the Java applet menu screen 10 is shown that lets a user access event information. This information could include choices for schedules, standings, and biographical info for example on the athletes and more on a main menu portion 12 and a sub-menu portion 14 can provide more specific user selected information. Of course, embodiments herein are not necessarily limited to Java applets and other application providing similar functions can be used.

Figure 2:
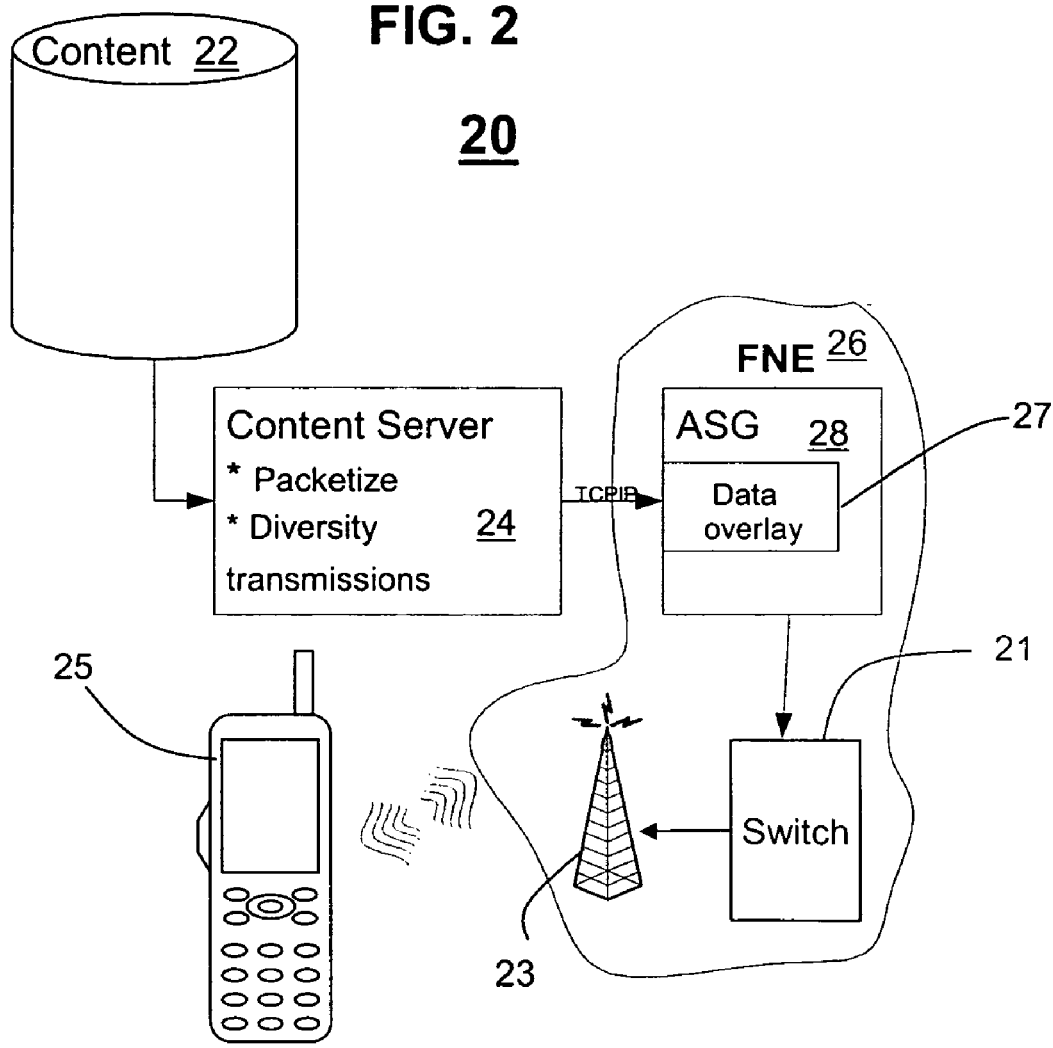
FIG. 2 is a block diagram of a system for targeted broadcasting in accordance with an embodiment of the present invention.

Referring to FIG. 2, an embodiment of a targeted or event broadcasting system 20 is shown. Information content 22 which can be real-time (scores, standing, special announcements) or prepared (bios of athletes, upcoming events, advertisements) can be passed to a content server 24. The content server 24 can segment the information into packets that are periodically broadcast using group call or a similar one-to-many cellular broadcast technology. The information can be segmented into chunks (for example with a duty cycle of 30%) to avoid long busy periods as information is broadcast to the receiving mobile units. Since most phones can only process one type of call at a time (voice calls, packet data, group calls, PTT-over-Cellular, etc.), segmenting the event broadcasts avoids disrupting normal phone operation. Another responsibility of the content server 24 is improving transmission reliability by optionally sending duplicate packets. By sending each information packet several times, the probability of a user receiving the packet error-free increases since there are no retries and ACK-NACK protocol required here to guarantee reception. On the receive side, the redundant transmissions can be discarded, particularly if an error free packet is received. It is also recommended that the transmission of duplicate packets be spread out over time to provide "diversity gain". This is known in the art to increase reliability.

The output of the content server 24 can be sent over a link such as TCP/IP to the Fixed Network Equipment (FNE) 26 which includes the cellular network infrastructure including control equipment, subscriber databases, and cellular base stations 21 and transmission towers 23. The FNE 26 can also include an Application Services Gateway (ASG) 28 that provides a data overlay for the group call service. Since group call and similar broadcast technologies are typically voice services used for dispatch and group communications, the ASG 28 provides a means for the voice channel to be used instead for data. This capability for multiplexing the use of a voice channel can be achieved on iDEN systems for example with an overlay 27 that provides data/voice multiplexing. Note, though, a system contemplated in accordance with embodiments herein can also optionally or alternatively use one or more dedicated broadcast channels to send the group call data instead of or in addition to using the (overlay) voice channel.

Figure 3:
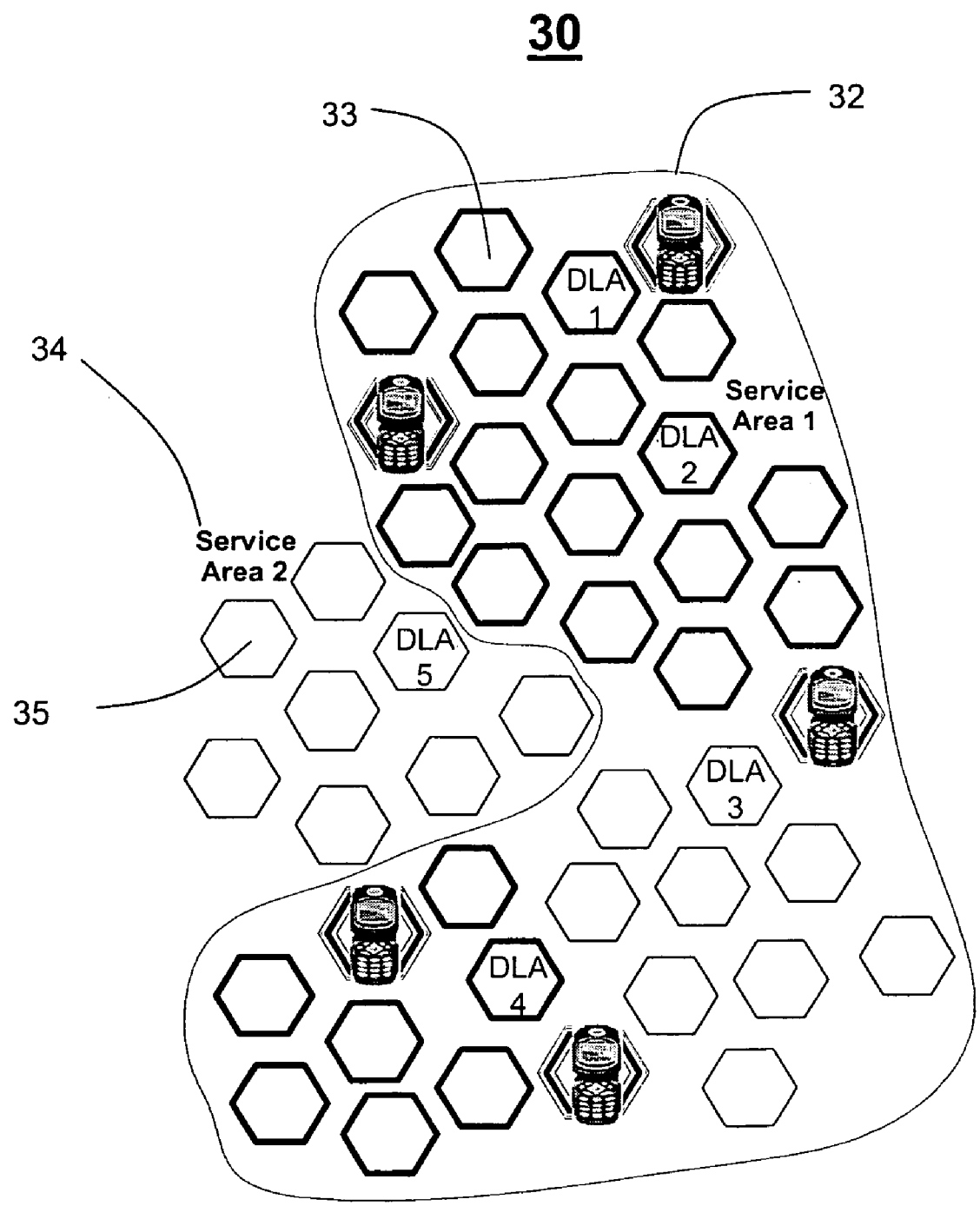
FIG. 3 is a block diagram of an plurality of service areas and a plurality of cell sites or dispatch location areas within the services areas in accordance with an embodiment of the present invention.

As the experience with the existing wireless applications demonstrate, hundreds of users in one location can overwhelm the packet data capacity of a typical cellular network. Therefore using a one-way broadcast such as group call to efficiently deliver event information to many closely clustered phones can be achieved herein without overwhelming the network and with minimal latency. One way to achieve the efficient one-way broadcast as described herein is with a form of group call as similarly used on iDEN networks, except that a group call as envisioned herein can limit or target a group call to as little as one cell. For further understanding of the group call techniques used herein, a summary of key characteristics of iDEN group call should be known. For example, Talk Group calls provide one-to-many voice service in a half duplex format. A mobile subscriber (MS) can join any talk group, but must first affiliate with a Talk Group in order to receive calls for that Talk Group. In iDEN as illustrated by the sample coverage map 30 of FIG. 3, group coverage is segmented by Dispatch Location Areas (DLA) 33 and 35 that are typically arranged to cover geographical features such as highways and Service Areas (SA) 32 and 34 which are groupings of one or more DLA's that constitute the user-selectable coverage area for group calls. A DLA can be comparable to a cell, but not exactly. The initiator of a Talk Group call can choose the service areas that his or her call will cover from these options of: Local (MS's in same service area), Selected (local plus one more service area) and Wide Area (all service areas).

Because group calls cover one or more service areas which are in turn made up of multiple DLA's and many cell sites, group calls typically cover a wide area which can cover hundreds of square miles. This makes standard group call unsuitable for targeted or event broadcast which aims to cover just one cell or at most a few cells.

In iDEN networks, initiating a group call will cause the FNE to page all cells with affiliated mobiles that are in the selected service area. Each MS then responds to the page with a Group Call Response. Upon receiving the Response, the FNE will start the group call in that cell. If no affiliated mobiles are present in a particular cell, the group call will not be started in the cell. Although the network described above is specific to an iDEN system, it should be understood that the scope of the invention is applicable to other networks having various configurations including cell structures and service areas or their functional equivalents.

Referring to FIG. 3 again, the coverage scheme used in iDEN systems for group calls is illustrated. In this example, service area 1 (32) is selected by the user for a group call and only cells contained in DLA's 1, 2, 3, and 4 will be paged to start a group call. However, the call will only start in a cell if a mobile is present and affiliated to the talk group.

Restricting Coverage of targeted or event broadcasts can be done by limiting the cell sites covered by a group call to just the sites covering the venue needed for the event broadcast. This can be done by modifying the MS to only respond to pages to join a group call if the MS is in the cell sites designated to cover an event broadcast.

Figure 4:
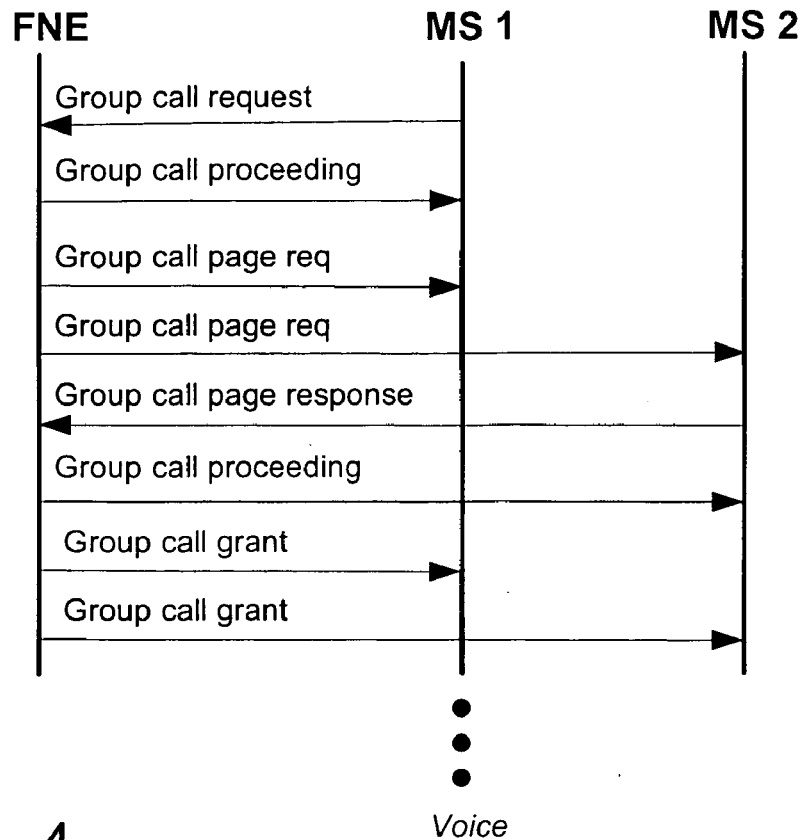
FIG. 4 is a timing diagram of a group call in accordance with an embodiment of the present invention.

Referring to FIG. 4, a simplified timing diagram illustrates the messages typically used to set-up group calls. As shown, MS1 starts the call by sending a group call request to the FNE and this is followed by an ACK (group call proceeding). The FNE then proceeds to page each cell in the target service area and a call is started if an MS responds to the page in a particular cell. Now, if a MS does not respond to the page, the call will not be started in the cell. Embodiments in accordance with the present invention can use this fact to limit the coverage area of an targeted or event broadcast call.

As mentioned earlier, for targeted or event broadcast to work effectively, group data calls should only start in the cell or cells designated to cover the event and not in surrounding cells. One way to achieve this functionality is to place logic into the MS that only responds to a group call page if the handset is camped on a cell designated to cover the event. Since suitably equipped phones camped on other cells outside the event area won't respond to the group page, the call won't start in their cells. Thus, users in cells outside the event area will not receive event broadcasts. For example, if the event will be covered by a specific cell site 1202, the MS will only send a group page response if it is located in cell 1202. If the MS is in any other cell, it will ignore the group page request.

Figure 5:
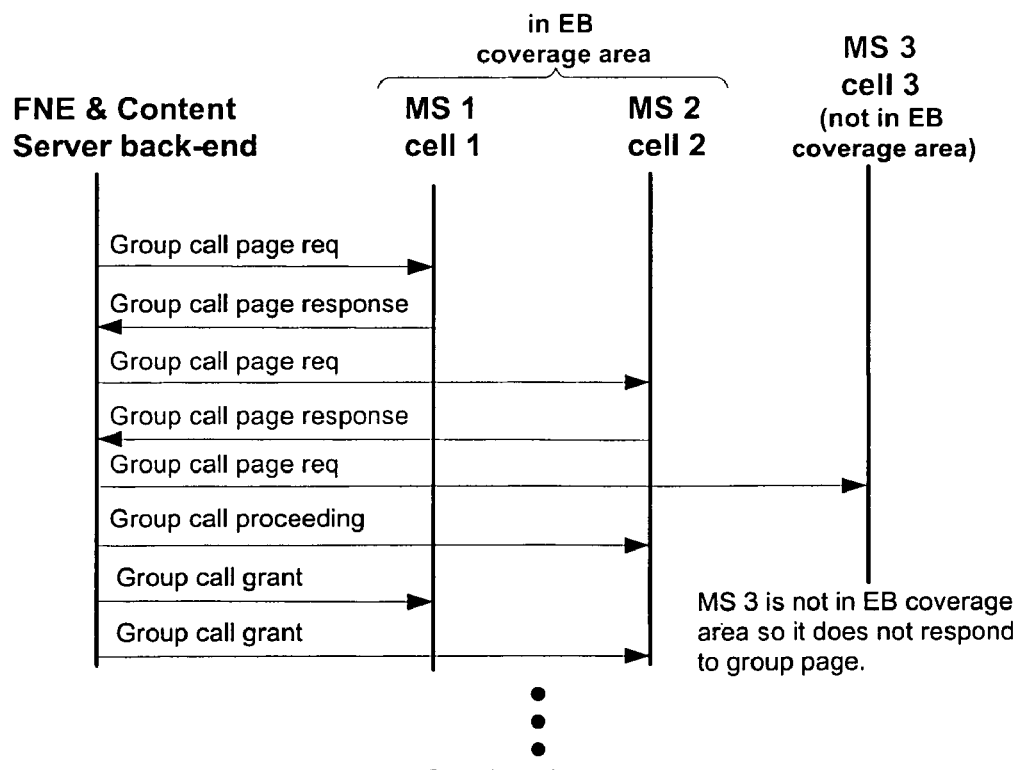
FIG. 5 is another timing diagram of a group call in accordance with an embodiment of the present invention.

In order for an MS to decide whether to respond to a group page or not, the MS needs to know it's location as well as the IDs of cells that are part of the targeted or event broadcast area. The MS can determine its approximate location by monitoring a control channel on the serving cell. This control channel typically transmits a message that uniquely identifies the serving cell. The MS can simply compare the ID of the serving cell against cell or cells designated to cover the event or targeted broadcast. If there is a match, then the MS will respond to the page with a Group Call Page Response or similar message and the FNE will start a group call in the cell. In fact, as shown in FIG. 5, each MS in the cell will send this response even though only the first response is needed by the FNE to start the call in this cell.

How does the MS know the cell or cells designated to cover the event? This information can be sent to the MS prior to the start of the event and may be sent using any messaging method such as group call, SMS, or packet-data. Upon receipt of this message, the MS will store this information which contains the designated cell(s) for the event and a start and expiration time for the event.

The team producing the targeted or event broadcast will, among its other tasks, determine the cell ID(s) needed to cover the event (probably by working with the cellular provider) and arrange for this information to be transmitted to the MS well ahead of the event. The MS will use this information during the event to decide whether to participate in the event (if the user is in the designated area) or ignore pages to join the targeted or event broadcast. Once this information expires (remember, the information can have a start and expiration time), it can be deleted from the mobile station's memory. Note, GPS location can also be used for locating the MS; however, the cell ID method is expected to be simpler and more reliable.

Referring to FIG. 5 again, the MS behavior both in a cell designated to receive a targeted or event broadcast and in a cell not designated to receive broadcasts is illustrated. The difference is that MS's in designated cells respond to group_call_page_request with an acknowledgement response whereas MS's outside the designated cells do not respond. As shown, the mobiles in cell 1 and 2 which are designated for targeted or event broadcasts respond with a page response such as a group_call_page_response. The MS in cell 3 which is not part of the targeted or event broadcast coverage area does not respond to the page and therefore the FNE will not start a group call in cell 3. The timing diagram of FIG. 5 assumes that all mobiles have affiliated to the group that carries the event broadcasts and that the mobile selectively ignores the broadcast if it is not in a designated cell. An alternative approach is for the handset to only affiliate to the group if it is in the designated cell. This latter approach would create significant network overhead of mobiles affiliating to the group as they enter the event broadcast coverage and because of this overhead, this approach is not recommended.

Figure 6:
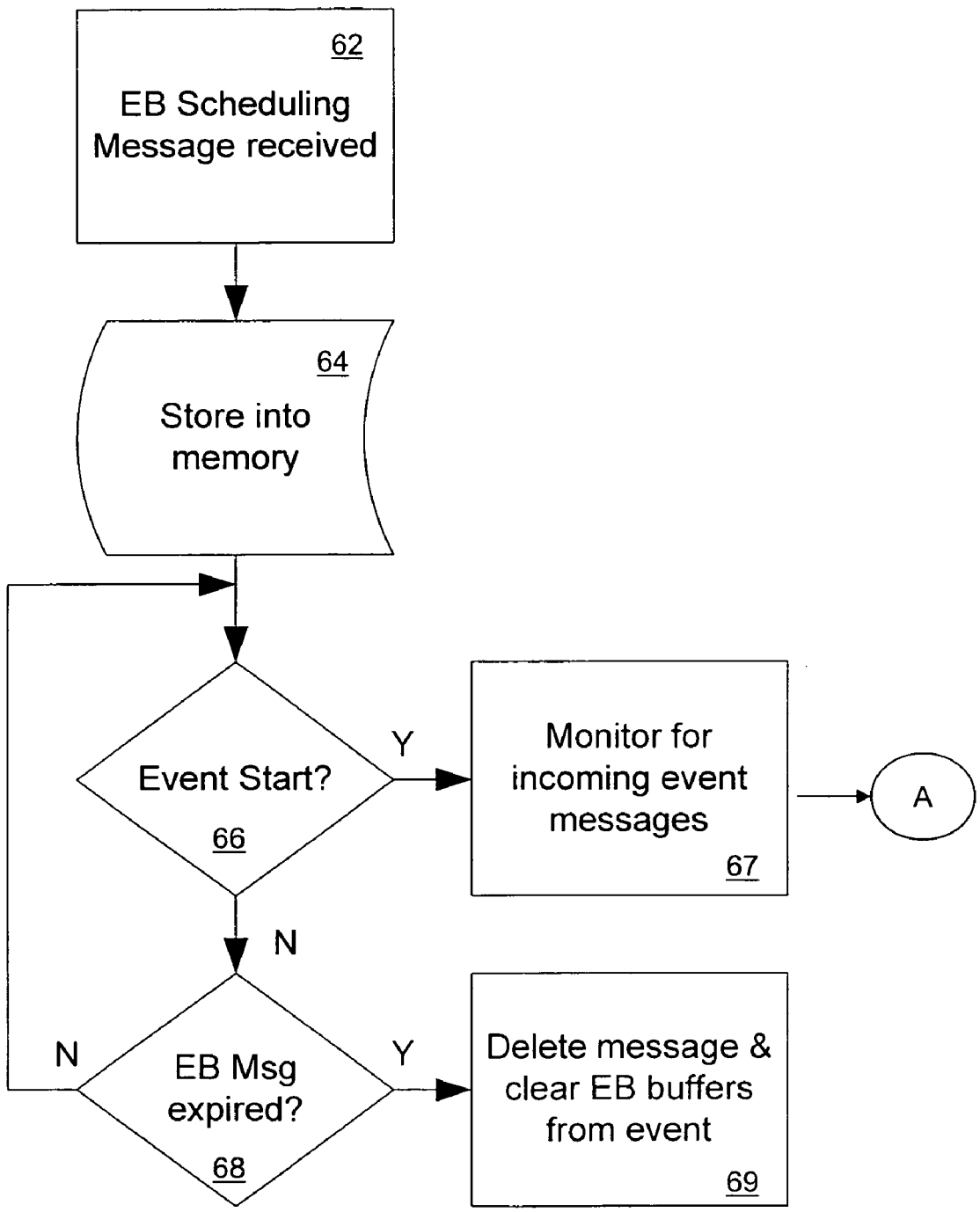
FIG. 6 is a flow chart illustrating a portion of a method of targeted broadcasting in accordance with an embodiment of the present invention.

Referring to FIG. 6, a flow chart illustrates a method 60 of receiving a targeted or event broadcast. In particular, the MS procedure for handling an event broadcast scheduling message is shown. As discussed above, the scheduling message is sent and received by the MS at step 62 prior to the event and tells the MS which cells are designated for an event broadcast and the start and expiration times for the event. The event broadcast scheduling information and other information can be stored in memory at step 64. As shown with decision block 66, the major steps upon receipt of a scheduling message is to set an event timer in the MS to watch for the event start time and once this time is reached, begin monitoring for event broadcasts at step 67 before moving on to step A. The MS can also delete the scheduling message at step 69 once it expires as determined at decision block 68 and clear event related buffers since the event has ended.

Figure 7:
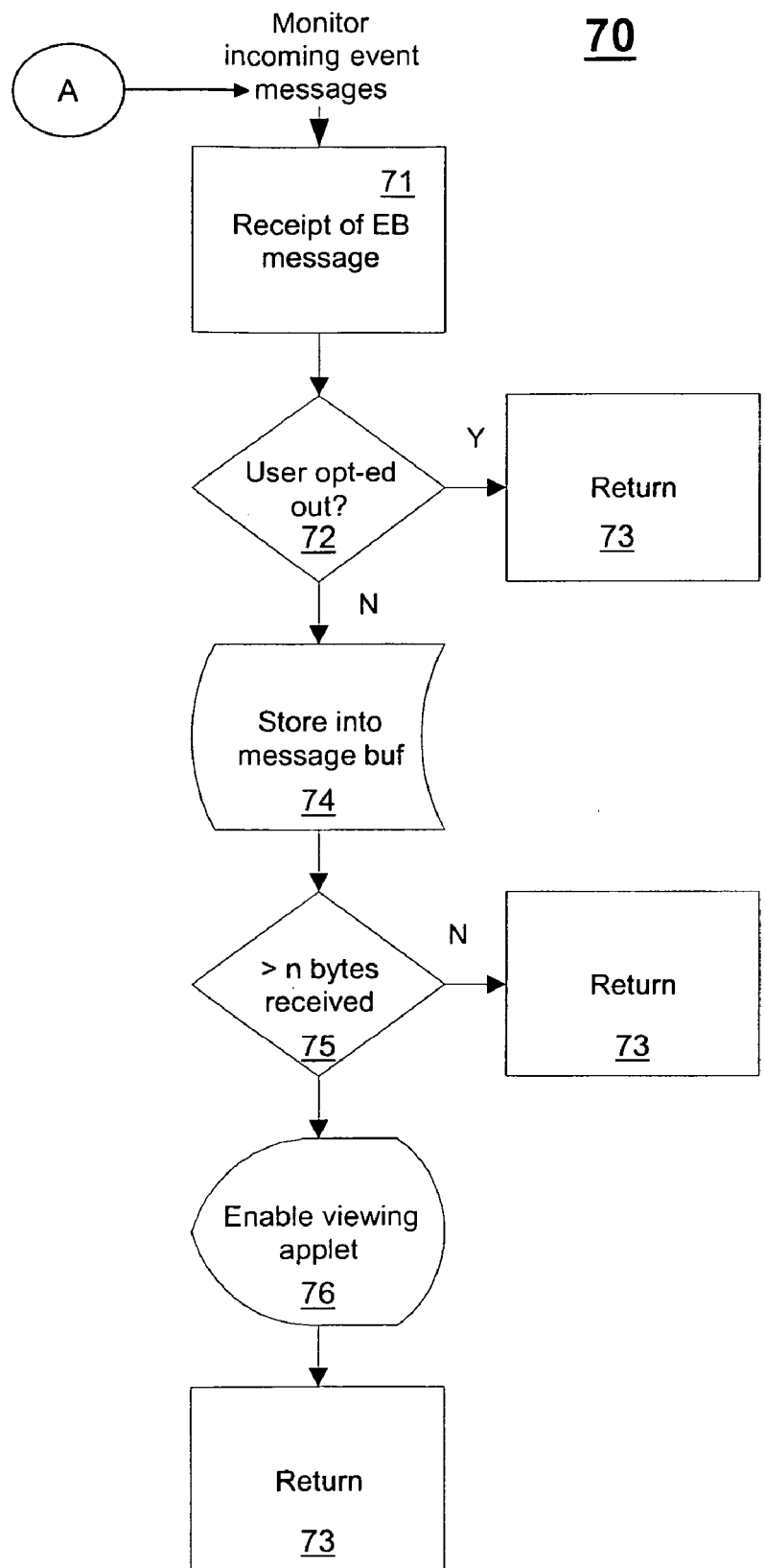
FIG. 7 is another flow chart illustrating a portion of a method of targeted broadcasting in accordance with an embodiment of the present invention.

Referring to FIG. 7, another flow chart illustrates a method 70 of receiving a targeted or event broadcast and the procedure for processing incoming event broadcast messages. As each message is received at step 71, the phone buffers the messages at step 74 after checking that the user hasn't opted-out of receiving broadcasts at step 72. The opt-out feature is a user interface option on the MS to allow users attending the event (or not-attending, but in coverage), to opt-out of broadcasts and enable return to normal processing at step 73. The procedure for receiving event broadcast messages also includes the optional step 75 of counting the number of bytes received and not displaying messages at step 76 until a pre-determined amount of information has been received. In this manner, the MS optionally waits until it has accumulated a sufficient amount of event information before allowing the information to be viewed. This threshold isn't absolute and can be set by the designer of the MS.

Note, embodiments herein also requires a browser such as a Java applet which allows the user to view the received event information. Browsers are well known in the art and this browser may be similar to web browsers because it allows users to view and navigate the tagged information received in the event broadcasts. The browser can include the ability to handle duplicate event broadcast packets to correct receives errors and should also support canned graphics to minimize the need to send images over the air.

In summary, the methods described herein provide for the delivery of event-specific information broadcasts that are tightly focused on just the location of the event using cellular data broadcasts. This differs from existing services and applications in several respects in that event broadcasts are transient in nature, usually lasting for a few hours, and are only active during the event and event broadcasts can be further sent to targeted cells and also segmented and sent in small chunks spaced out over time. By spacing the broadcasts out, for example, 2 seconds of broadcast out of every 10 second window, the reception of event broadcasts shares the phone's resources with other functions such as cellular calls, group and private calls and packet data services. Another difference is that schedules for event broadcasts are sent ahead of time (like a channel guide) over a common group call channel which is monitored by all mobiles. These schedules provide handsets with the time and duration of upcoming events, cell ID(s), and the group call channel to monitor for EB's. After a mobile receives one or more event schedules, it monitors the start time of the event and the cell ID(s) where coverage is provided. If the mobile finds itself in coverage while the event is in progress, it can begin receiving event broadcasts over the group call channel. This process starts by responding to group pages on the event broadcast channel as described in detail above. If the mobile is not in coverage (the mobile is not camped on one of the event broadcast cell IDs), then the mobile will ignore group pages. In one embodiment, the user has the option to opt-out of receiving event broadcasts if they are within the coverage area. Opting-out will typically cause the mobile to leave (de-affiliate) from the group providing EB's. The method described here activates the event-specific broadcasts in the cell or cells covering the event. Unlike packet-data based applications, one-way data broadcasts Using group call utilize network resources sparingly which is essential when hundreds of phones may be in use in a single location.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A system of targeted broadcasting in a cellular communication system during an event, comprising:
   at least one mobile unit having stored therein scheduling information relating to an event, a designated location for the event, and a designated group channel for monitoring such event, wherein the at least one mobile unit is programmed to:
   receive and store the scheduling information relating to the event, the designated location information, and the designated group channel to monitor for receipt of a targeted broadcast;
   monitor for at least one among the event, the designated location information, and the designated group channel during a predetermined time window; and
   receive a targeted message during the event on the designated group channel when a current location of the at least one mobile unit matches the designated location information stored.

2. The system of claim 1, wherein the system further comprises fixed network equipment transmitting data related to the event, wherein the fixed network equipment is coupled to a server providing data related to the event and wherein the fixed network equipment further comprises a processor programmed to:
broadcast a group call message to the plurality of mobile units and a plurality of other mobile units;
receive at least one group call message response from one among the plurality of mobile units;
broadcast group call data related to the event to designated locations among locations where the group call message response was transmitted from among the plurality of mobile units.

3. The system of claim 2, wherein the system further comprises a application services gateway that provides a data overlay for a group call enabling a voice channel to be used as a data channel.

4. The system of claim 2, wherein the fixed network equipment, in addition to the group call message, transmits at least one among voice call, packet data, and push-to-talk over cellular communication type calls.

5. The system of claim 2, wherein at least one among the plurality of mobile units are programmed to transmit at least one group call message response in response to receiving the group call message only when the at least one mobile unit is in the designated location.

6. A system for sending targeted broadcasts on a cellular communication system having a plurality of mobile units having stored therein scheduling information relating to an event, a designated location for the event, and a group channel for monitoring such event, the system comprising:
fixed network equipment transmitting data related to the event, wherein the fixed network equipment is coupled to a server providing data related to the event and wherein the fixed network equipment further comprises a processor programmed to:
broadcast a group call message to the plurality of mobile units and a plurality of other mobile units;
receive at least one group call message response from one among the plurality of mobile units; and
broadcast group call data related to the event to designated locations among locations where the group call message response was transmitted from among the plurality of mobile units.

7. The system of claim 6, wherein the system further comprises a application services gateway that provides a data overlay for a group call enabling a voice channel to be used as a data channel.

8. The system of claim 6, wherein the fixed network equipment, in addition to the group call message, transmits at least one among voice call, packet data, and push-to-talk over cellular communication type calls.

9. The system of claim 6, wherein the fixed network equipment is programmed to transmit duplicate packets of the group call data related to the event.

10. The system of claim 6, wherein the designated location for the event corresponds to at least one predetermined cell designated to cover the event.

11. The system of claim 10, wherein the at least one predetermined cell designated to cover the event transmits a cell identifier.

12. The system of claim 6, wherein at least one among the plurality of mobile units are programmed to transmit at least one group call message response in response to receiving the group call message only when the at least one mobile unit is in the designated location.

13. A method of targeted broadcasting in a cellular communication system during an event, comprising the steps at a mobile cellular unit of:
receiving and storing scheduling information relating to the event, designated location information, and a designated group channel to monitor for receipt of such targeted broadcast;
monitoring for at least one among the event, the designated location information, and the designated group channel during a predetermined time window; and
receiving a targeted message during the event on the designated group channel when a current location matches the designated location information stored.

14. The method of claim 13, wherein the method further comprises the step of transmitting a group call response in response to receiving a group call page request only when the mobile cellular unit is a location matching the designated location information.

15. The method of claim 13, wherein the step of receiving the targeted message on the designated group channel comprises receiving the targeted message only in a set of designated cell locations after at least one among a group of mobile cellular units provides a group call response in a cell among the set of designated cell locations.

16. The method of claim 13, wherein the step of receiving a targeted message comprises receiving a half-duplex group call.

17. The method of claim 13, wherein the method further comprise the step of determining the current location by performing one among the steps of monitoring a control channel for a location identifier and monitoring a GPS receiver for GPS information.

18. The method of claim 13, wherein the method further comprises the step of ignoring the targeted message if the mobile cellular unit's current location fails to match the designated location information.

19. The method of claim 13, wherein the step of receiving the targeted message is received in segmented portions over a period of time.

20. The method of claim 13, wherein the method further comprises the step of optionally enabling a user to opt-out of receiving the targeted message by de-affiliating from the designated group channel.

* * * * *